(12) United States Patent
Kimura

(10) Patent No.: US 7,167,729 B1
(45) Date of Patent: Jan. 23, 2007

(54) PORTABLE ELECTRONIC APPARATUS

(75) Inventor: Etsuko Kimura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/408,265

(22) Filed: Sep. 29, 1999

(30) Foreign Application Priority Data

Sep. 29, 1998 (JP) ................. 10-291533

(51) Int. Cl.
*H04M 1/00* (2006.01)
*H04M 3/42* (2006.01)

(52) U.S. Cl. .................. 455/566; 379/201.04

(58) Field of Classification Search .......... 379/433.06, 379/915, 88.11, 233.07, 433.04; 455/566, 455/414.1, 556.2
See application file for complete search history.

(56) References Cited

U.S. PATENT DOCUMENTS

| | | | | |
|---|---|---|---|---|
| 4,730,252 A | * | 3/1988 | Bradshaw | 707/4 |
| 4,926,497 A | * | 5/1990 | Shirley et al. | 455/418 |
| 5,479,476 A | | 12/1995 | Finke-Anlauff | |
| 5,561,712 A | * | 10/1996 | Nishihara | 379/355.01 |
| 5,737,394 A | * | 4/1998 | Anderson et al. | 379/88.11 |
| 5,742,295 A | * | 4/1998 | Lindholm | 345/427 |
| 5,797,098 A | * | 8/1998 | Schroeder et al. | 455/464 |
| 5,892,475 A | * | 4/1999 | Palatsi | 345/810 |
| 5,938,772 A | * | 8/1999 | Welch | 713/320 |
| 5,956,655 A | * | 9/1999 | Suzuki et al. | 455/566 |
| 5,987,613 A | * | 11/1999 | Busch et al. | 713/300 |
| 6,097,964 A | * | 8/2000 | Nuovo et al. | 455/566 |
| 6,169,911 B1 | * | 1/2001 | Wagner et al. | 455/566 |
| 6,193,152 B1 | * | 2/2001 | Fernando et al. | 235/380 |
| 6,408,191 B1 | | 6/2002 | Blanchard et al. | |

FOREIGN PATENT DOCUMENTS

| | | |
|---|---|---|
| EP | 0 633 684 | 1/1995 |
| GB | 2 256 954 | 12/1992 |
| GB | 2 310 567 | 8/1997 |
| GB | 2 314 726 | 1/1998 |
| GB | 2 326 561 A | 12/1998 |
| JP | 5-35682 | 2/1993 |
| JP | 5-83350 | 4/1993 |
| JP | 7-250135 | 9/1995 |
| JP | 7-297891 | 11/1995 |
| JP | 8-65746 | 3/1996 |
| JP | 08-251266 | 9/1996 |
| JP | 8-255067 | 10/1996 |
| JP | 9-149105 | 6/1997 |
| JP | 9-149129 | 6/1997 |
| JP | 09-185450 | 7/1997 |
| JP | 9-321839 | 12/1997 |
| JP | 10-23117 | 1/1998 |

(Continued)

*Primary Examiner*—Fan Tsang
*Assistant Examiner*—Simon Sing
(74) *Attorney, Agent, or Firm*—Sughrue Mion, PLLC

(57) ABSTRACT

A portable electronic apparatus includes guide areas associated one-to-one with preselected keys arranged on a key input section and displays, in each of consecutive operation steps, guidance information representative of items which can be selected by the user in the above guide areas. This successfully guides the user of the apparatus to an adequate operating method without resorting to key names heretofore displayed to show correspondence between operation items and keys. The apparatus is therefore practicable with a minimum display size.

30 Claims, 14 Drawing Sheets

FOREIGN PATENT DOCUMENTS

| | | |
|---|---|---|
| JP | 10-161829 | 3/1998 |
| JP | 10-97368 | 4/1998 |
| JP | 10-161829 | 6/1998 |
| JP | 10-164226 | 6/1998 |
| JP | 10-290275 | 10/1998 |
| JP | 11-331326 | 10/1998 |
| JP | 11-3196 | 1/1999 |
| JP | 11-431115 | 12/1999 |
| WO | WO 98/37681 | 8/1998 |
| WO | WO 99/45459 | 9/1999 |

* cited by examiner

PORTABLE ELECTRONIC APPARATUS

BACKGROUND OF THE INVENTION

The present invention relates to a portable electronic apparatus of the type allowing the user thereof to select a desired function and more particularly to a portable electronic apparatus capable of guiding the user thereof to an operating method matching with a desired function.

A handy phone belonging to a family of portable electronic apparatuses has various functions and requires the user of the phone to select each function by operating keys in a particular manner. This complicates the operation of the handy phone and makes it difficult for the user to acquire an operating method function by function by perusing an operation manual. Moreover, it is impractical for the user of the phone to carry an operation manual at all times. In such circumstances, there is an increasing demand for a handy phone capable of guiding the user to an operating method matching with the individual function without resorting to an operation manual.

Japanese Patent Laid-Open Publication No. 5-35682 discloses a portable information storing device including a guidance memory storing operation guidance information function by function and step by step, a memory for managing the progress of the operation step, and display for displaying the guidance information read out of the memory in accordance with the progress of the operation step. The information storing device additionally includes a key input section on which a NEXT key and a SET key are arranged together with other keys. In a certain stage of operation, next item selection processing and registration processing are available as two different operation items. The user of the device has to press the NEXT key to select the next item or press the SET key to register a desired item. Specifically, the device displays the following guide information:

Next item with "NEXT" key.

Register with "SET" key.

The above information storing device guides the user by displaying particular guidance information in each operation step. The device therefore allows even an untrained person to operate the device in an adequate manner. However, the device displays even the names of the keys for implementing each operation step and therefore needs a number of characters to display. That is, in the above specific stage of operation, the device has to display not only the character sequences "next item" and "register" but also character sequences "with "NEXT" key" and "with "SET" key". This kind of apparatus is therefore not feasible for a portable electronic apparatus including a small size display.

Technologies relating to the present invention are also disclosed in, e.g., Japanese Patent Laid-Open Publication Nos. 5-83350, 7-250135, 8-65746, 9-149105, 8-255067, 9-321839, 10-23117, and 10-97368.

SUMMARY OF THE INVENTION

It is therefore an object of the present invention to provide a portable electronic apparatus capable of obviating character sequences designating keys on a guidance picture, and guiding the user of the apparatus to an operating method matching with a desired function even with a small size display.

In accordance with the present invention, a portable electronic apparatus including a display and allowing the user thereof to select a function includes a plurality of keys associated one-to-one with a plurality of guide areas included in the display. A controller displays, in each operation step, particular operation items which can be selected by the user in the guide areas, and executes, when any one of the keys is pressed, processing relating to one of the operation items appearing in one of the guide areas associated with the key pressed.

Also, in accordance with the present invention, a portable electronic apparatus includes a storage for storing, for each of a plurality of functions, operation items which can be selected by the user of the apparatus operation step by operation step. A display includes a plurality of guide areas each for displaying respective guidance information representative of an operation item which can be selected by the user. A key input section includes a plurality of keys associated one-to-one with the guide areas. A controller manages the progress of the operation step, and displays, in each operation step, the guidance information representative of the operation items stored in the storage in the guide areas, and executes, when any one of the keys is pressed, processing relating to one of the operation items appearing in one of the guide areas associated with the key pressed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
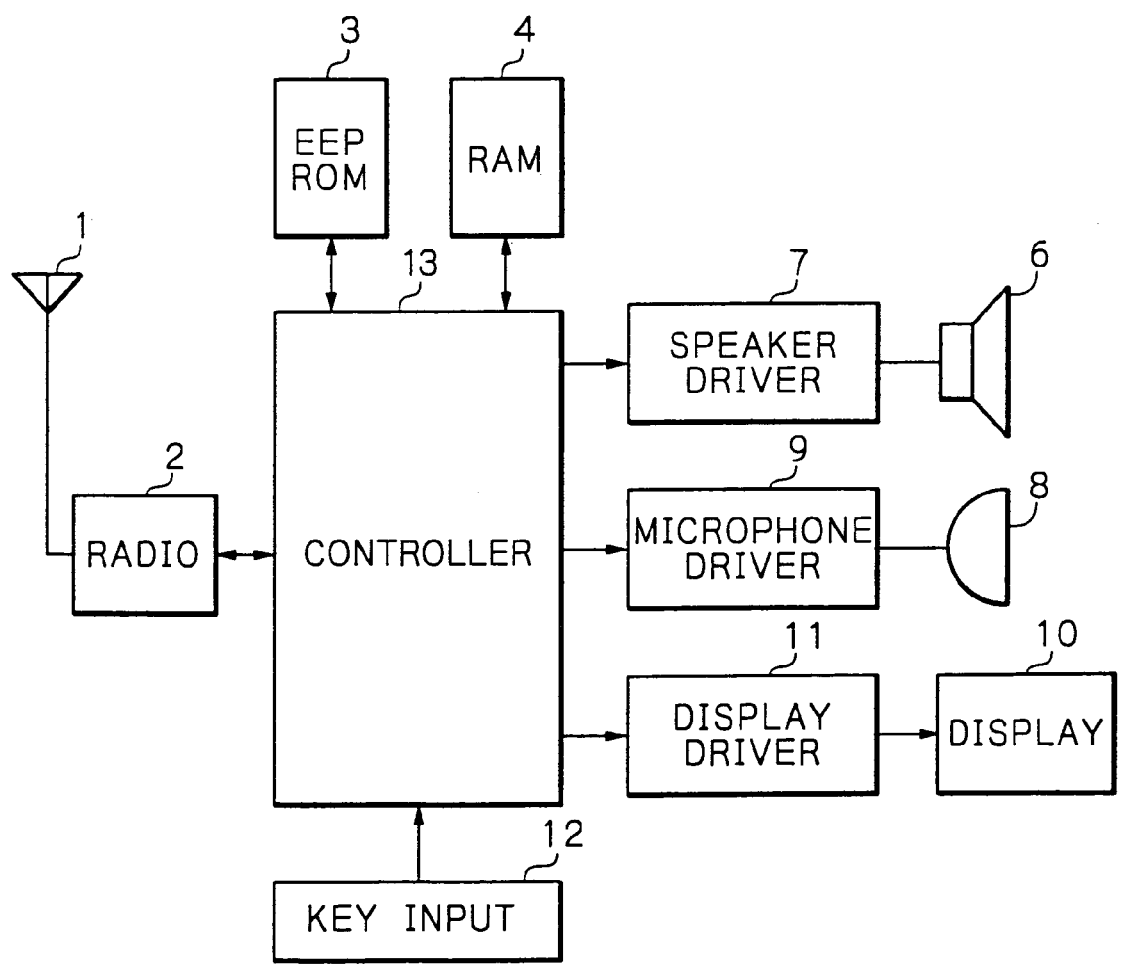
FIG. 1 is a block diagram schematically showing a portable electronic apparatus embodying the present invention and implemented as a handy phone by way of example.

Referring to FIG. 1 of the drawings, a portable electronic apparatus embodying the present invention is shown and implemented as a handy phone by way of example. As shown, the phone includes a radio 2 for sending and receiving radio signals via an antenna 1. An EEPROM (Electrically Erasable Programmable Read Only Memory) or similar nonvolatile memory 3 stores various programs and control data necessary for the operation of the handy phone. A RAM (Random Access Memory) 4 temporarily stores various kinds of data. A speaker 6 is driven by a speaker driver 7 to output a ringer tone and a received speech. A speech uttered by the user of the phone is input to a microphone 8 which is driven by a microphone driver 9. An LCD (Liquid Crystal Display) or similar display 10 is driven by a display driver 11 to display various kinds of pictures including guidance pictures meant for the user. A key input 12 includes various kinds of keys. A controller 13 controls the above constituents of the phone and includes a CPU (Central Processing Unit). A battery or power supply for feeding power to the various sections of the handy phone is not shown.

Figure 2:
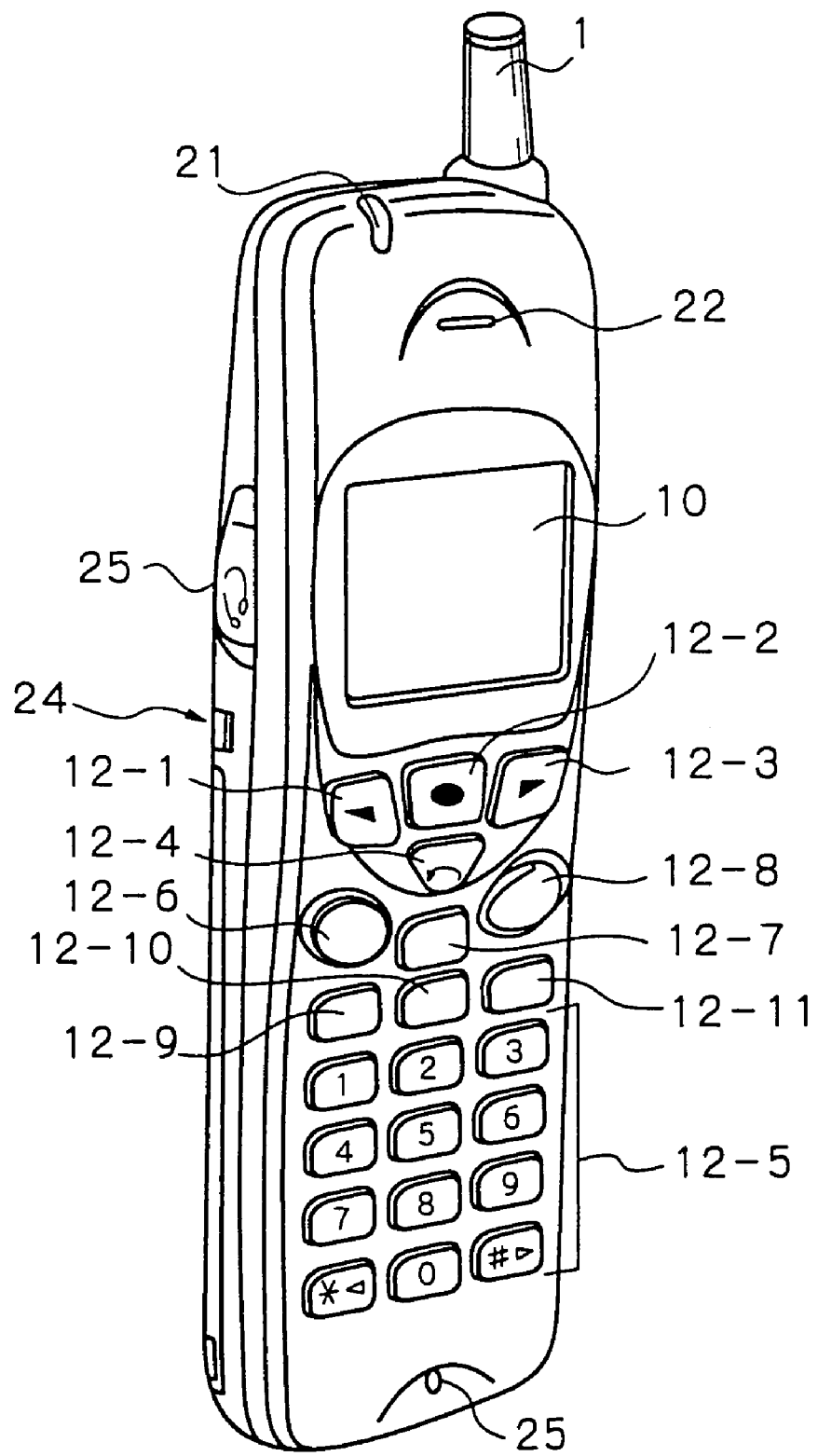
FIG. 2 is an external oblique view showing the handy phone of FIG. 1.

FIG. 2 shows a specific configuration of the above handy phone in an external view. In FIG. 2, the same structural elements as the elements shown in FIG. 1 are designated by like reference numerals. As shown, the key input 12 includes keys or buttons 12-1 through 12-11. A lamp 21 flashes when a call is terminated at the phone. A received speech output from the speaker 6 is heard via an opening 22. An earphone/microphone terminal 23 is provided on one side of the handy phone. A sounder 24 outputs an alert tone when the phone receives a call. A speech uttered by the user is input to the microphone 8 via an opening 25. The display 10 is positioned on the front panel of the phone slightly above the center of the panel.

The keys 12-1 through 12-11 included in the key input 12 are arranged below the display 10. The keys 12-5 are made up of numeral keys for inputting numerals and symbol keys for inputting symbols "#" and "*". The key 12-4 is used to return to the immediately preceding condition during operation. The key 12-6 allows the user to call a desired function with voice (voice searching function). The key 12-7 is a power key. The key 12-8 is used to select a silence mode. The key 12-9 is a start key to be pressed for originating or answering a call. The key 12-10 is a redial key for redialing a phone number dialed immediately before. The key 12-11 is an end key for ending conversation or discontinuing an operation for setting various functions. The keys 12-1, 12-2 and 12-3 each are assigned to a particular guide area to appear on the display 10, as will be described specifically later. The keys 12-1, 12-2 and 12-3 will hereinafter be referred to as a left key, a center key and a right key, respectively.

Figure 3:
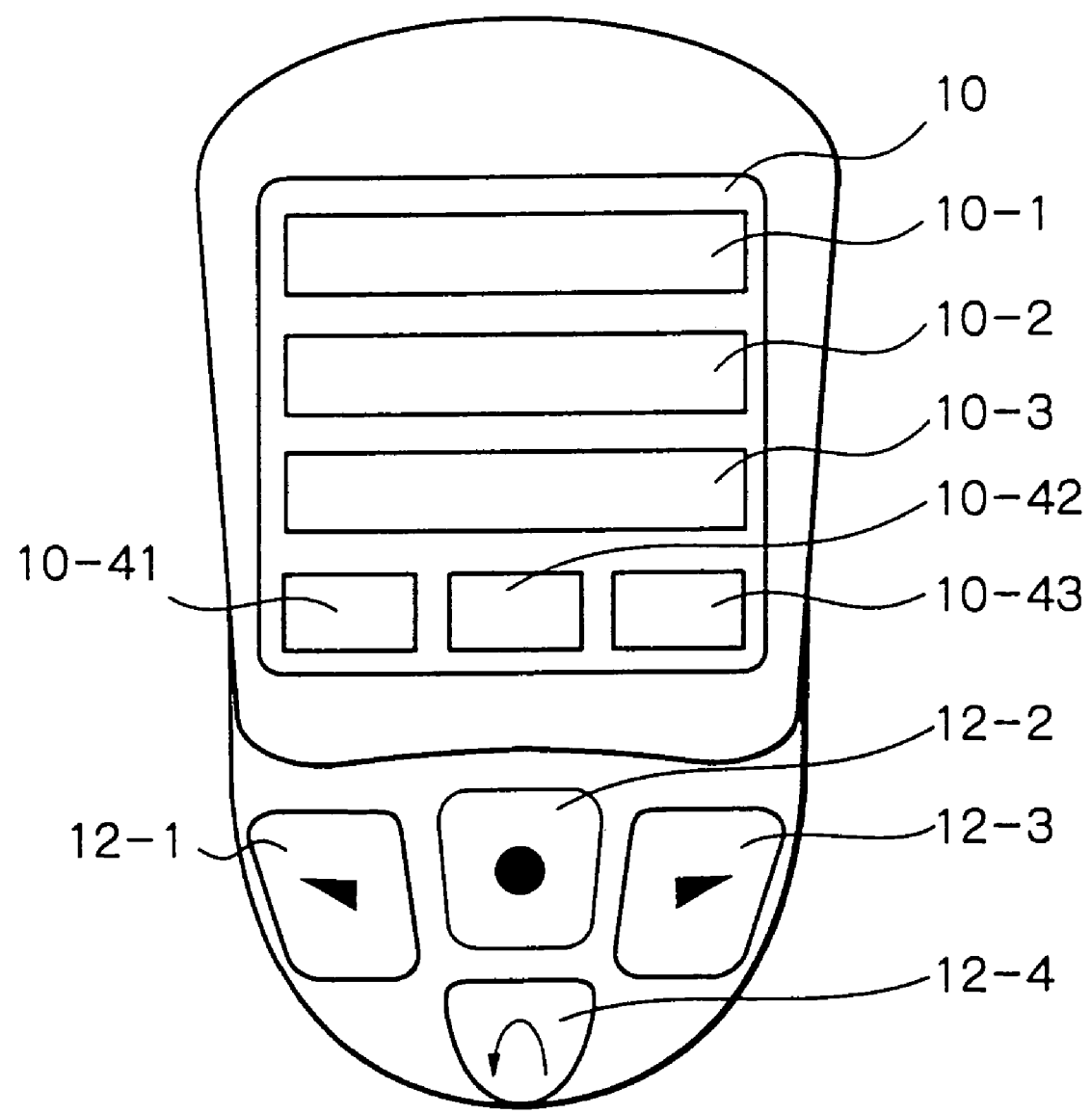
FIG. 3 is a fragmentary enlarged view showing a display included in the illustrative embodiment together with keys adjoining it.

FIG. 3 shows the display 10 and the keys adjacent thereto in an enlarged scale. As shown, in the illustrative embodiment, the display 10 has four horizontal display lines. The first line 10-1 displays marks representative of a battery voltage level, a character input mode, a radio wave receipt level, an outside-of-area message, etc. The second line 10-2 displays, e.g., a name assigned to a function. The third line 10-3 displays, e.g., a condition in which a function is set. In the illustrative embodiment, the fourth line is divided into three guide areas 10-41, 10-42 and 10-43. The right key 12-1, center key 12-2 and right key 12-3 are associated with the guide areas 10-41 through 10-43 each display particular guidance information representative of an item which the user can select. The guidance information is selectively implemented as a character sequence representative of an item to be selected or as a mark representative of various values being set and appearing on the third line 10-3.

Figure 4:
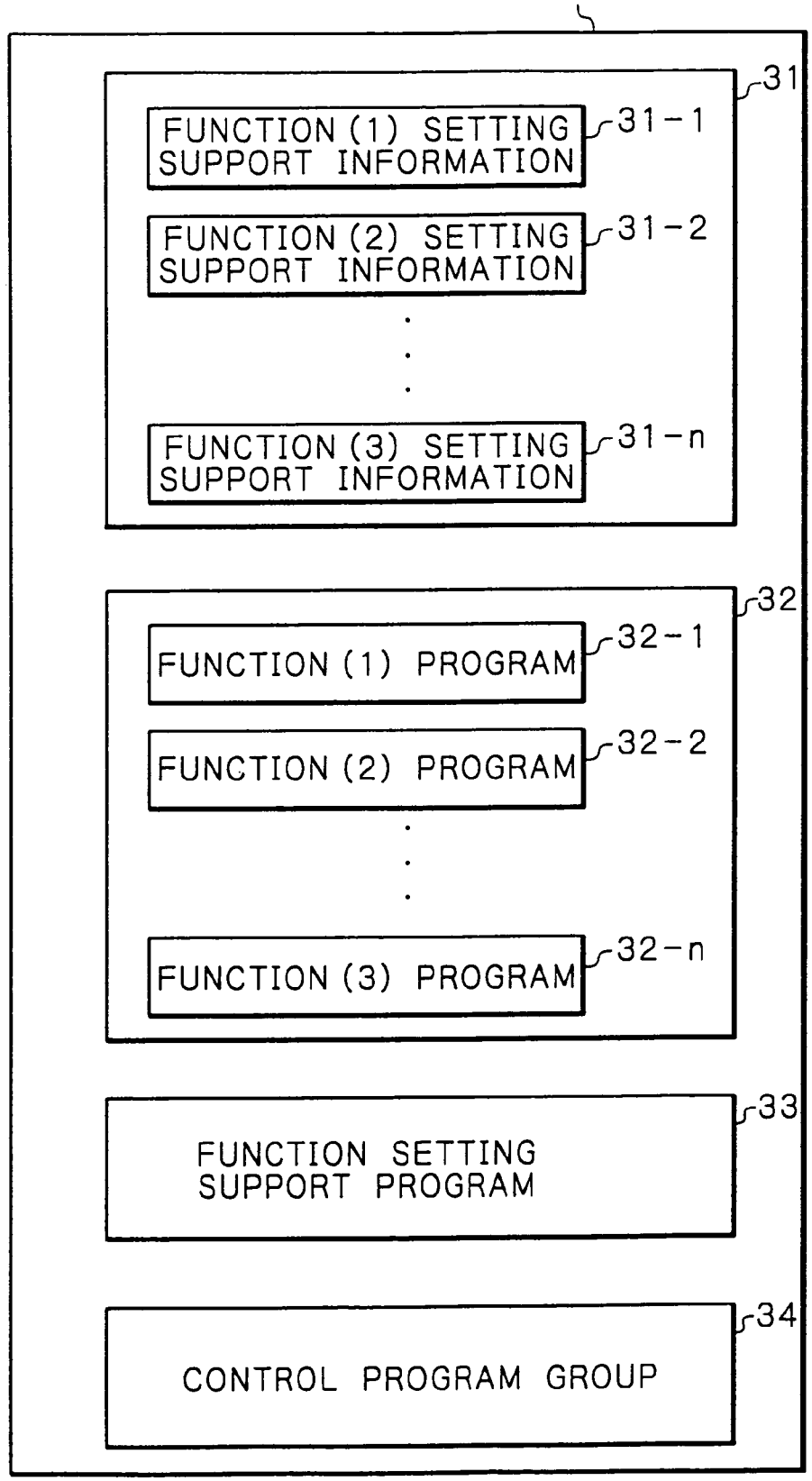
FIG. 4 shows specific contents of a nonvolatile memory included in the illustrative embodiment.

FIG. 4 shows contents stored in the EEPROM 3. As shown, the EEPROM 3 includes a setting support information area 31 storing setting support information 31-1 through 31-n each being assigned to a particular function available with the phone. A function program area 32 stores programs 32-1 through 32-n each being assigned to a particular function. The EEPROM 3 additionally includes a function setting support program 33 and a control program group 34 which controls call origination, call termination and other basic operations of the phone.

Figure 5A:
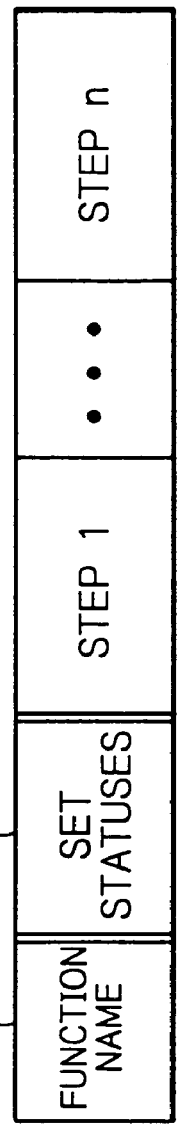
FIGS. 5A–5C shows specific formats of setting support information stored in the memory of FIG. 4.
Figure 5B:
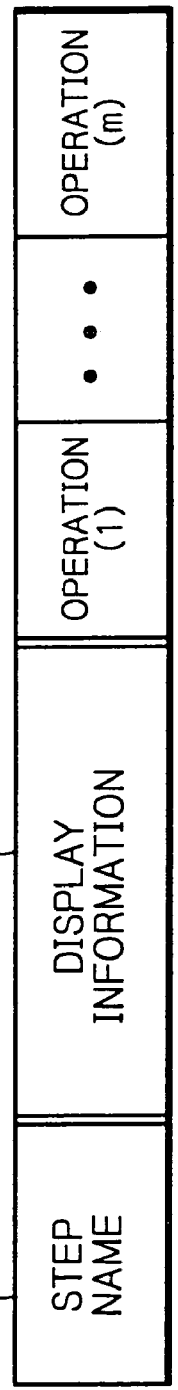
Figure 5C:

As shown in FIG. 5A, the setting support information 31-1 through 31-n each are made up of a function name 311, a set status 312, and step-by-step information 313. The function name 311 is representative of a function while the set status 312 is representative of the current status of the function. As shown in FIG. 5B, each information 313 relating to a particular step is made up of a step name 3131, display information 3132, and operation-by-operation information 3133. The step name 3131 distinguishes the associated operation step from the other steps. The display information 3132 shows a guidance picture to be displayed in the operation step; when the operation step includes any operation item which can be selected, the operation item is described in the information 3132. As shown in FIG. 5C, each operation information 3133 is made up of an operation content 31331, a processing content 31332, and next step information 31333. The operation content 31331 is representative of the content of an operation performed by the user. The processing content 31332 is representative of processing to be executed in response to a user's operation indicated by the operation content 31331. The next step information 31333 shows an operation step to be executed just after a user's operation. Specifically, the next step information 31333 describes a step name if the next step to be executed is present, but has a value NULL if otherwise.

Figure 6:
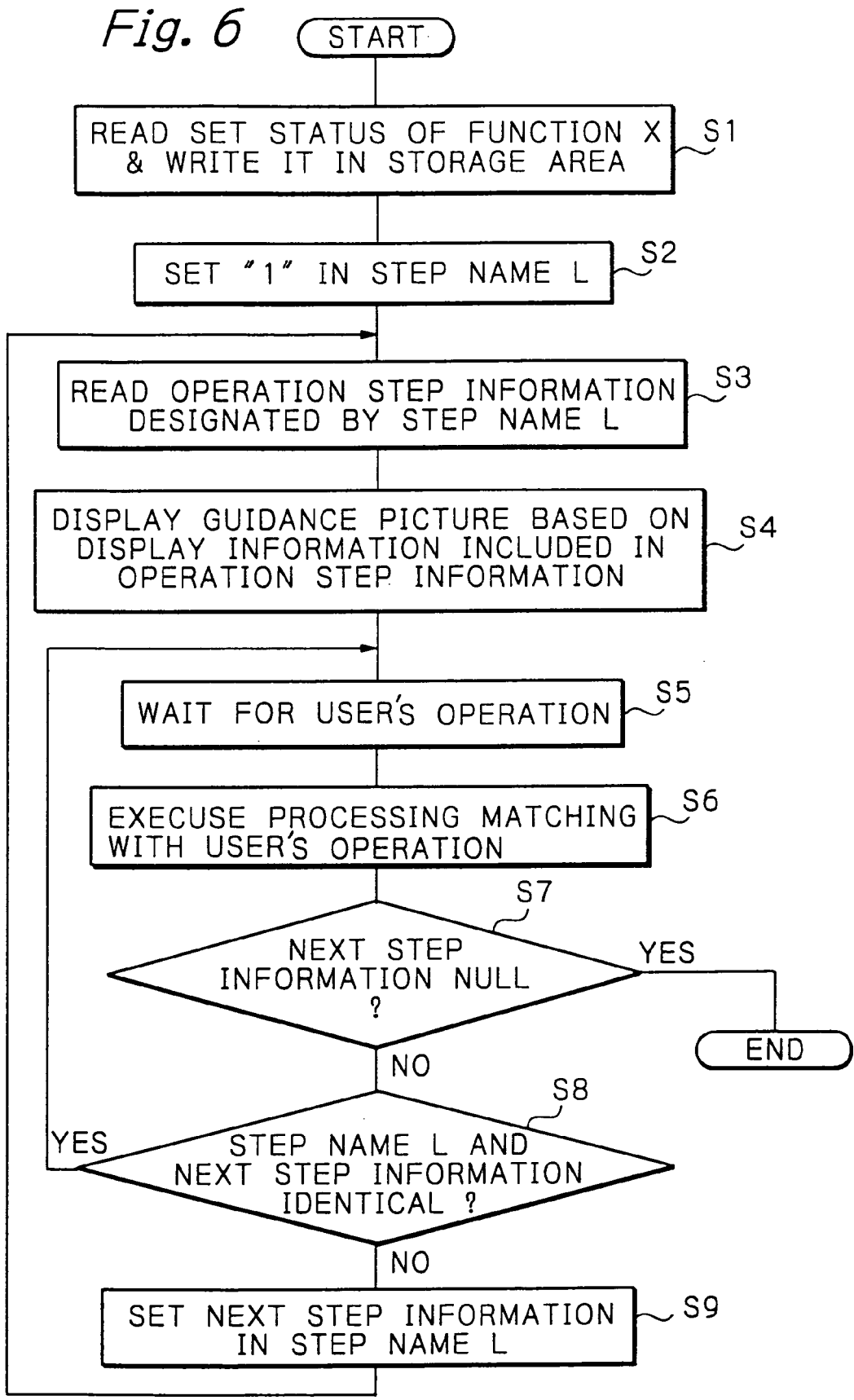
FIG. 6 is a flowchart demonstrating a specific procedure to be executed by a function setting support program stored in the memory of FIG. 4.

Referring again to FIG. 4, the function setting support program 33 supports the user intending to select a desired function. When the user selects a certain function, the controller 13, FIG. 1, executes the support program 33. FIG. 6 shows a specific sequence of steps representative of the support program 33. As shown, when the user selects a certain function X, the controller 13 searches the setting support information area 31 of the EEPROM 3 with a function name X and sets the setting status 312 of setting support information 31-X relating to the function X in its storage area (step S1). Thereafter, the controller 13 varies the set status within the above storage area, so that the set status is reflected by the original status 312 of the EEPROM 3 at the end of setting. Subsequently, the controller 13 sets "1" in a step name L, which is a variable in stored in the controller 13, as an initial value (step S2), then reads operation step information relating to the step name 1 out of the operation step information 313 of setting support information 31-X (step S3), and then displays a guidance picture on the display 10 in accordance with the display information 3132 included in the information 313 (step S4). In this condition, the controller 13 waits for a user's operation (step S5).

In response to some user's operation, the controller 13 executes corresponding processing in accordance with the operation content 31331 and processing content 31332 included in the operation information 3133 of the information 313 (step S6). On completing the above processing, the controller 13 determines whether or not the next step information 3133 of the operation information 3133 is NULL (step S7). If the answer of the step S7 is positive (YES), the controller 13 ends the support program 33. If the answer of the step S7 is negative (NO) and if the next step information is identical with the processing under way (YES, step S8), the controller 13 returns to the step S5. If the answer of the step S8 is NO, the controller 13 sets the next step information set in the next step information 31333 in the step name L (step S9) and then returns to the step S3.

Figure 7:
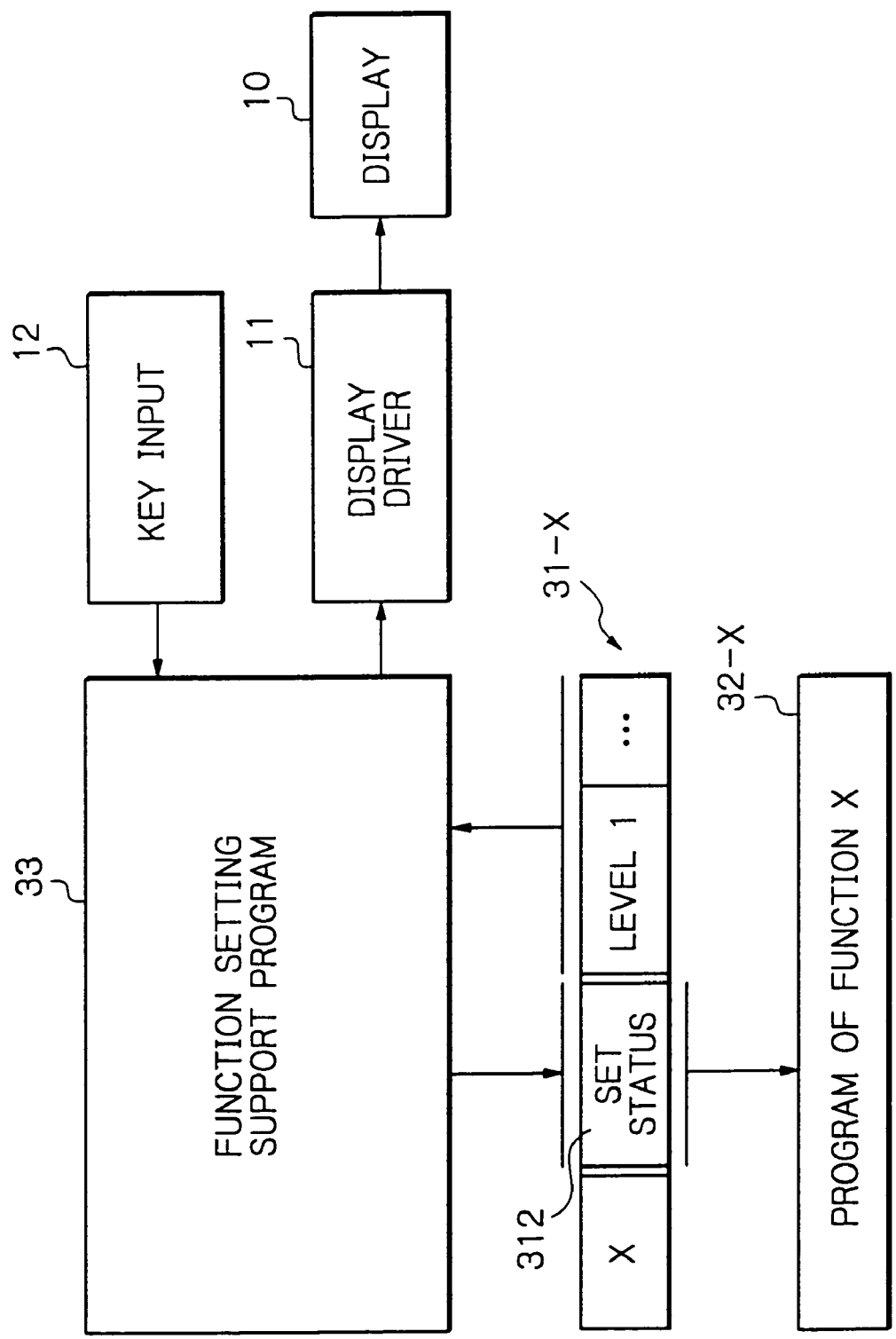
FIG. 7 is a schematic block diagram showing a relation between a given function program and associated setting support information and the function setting support program stored in the memory of FIG. 4.

The function programs 32-1 through 32-n, FIG. 4, each operate in accordance with the set status 312 included in corresponding one of the setting support information 31-1 through 31-n. Specifically, as shown in FIG. 7, each function program 32-X controls the assigned operation by referencing the set status 312 included in setting support information 31-X corresponding to the program 32-X. When the user changes, under the support of the function setting support program 33, the set status 312 of the setting support information 31-X by interaction using the key input 12 and display 10, the operation of the function program 32-X is changed.

The operation of the illustrative embodiment will be described more specifically hereinafter. The following description will concentrate on the function program 32-X and setting support information 31-X associated therewith by way of example. The first line 10-1 of the display 10 will not be shown or described because it is not directly relevant to the guidance procedure.

(1) Key Tone Function for Confirmation

This function has the value of a key tone flag (ON or OFF) as its set status. Assume that a key tone flag 312 included in the setting support function 31-X is ON, the function program 32-X produces a key tone for confirmation every time the operator surely presses any one of the keys 12-1 through 12-11. If the key tone flag 312 is OFF, the program 32-X does not produce any key tone.

Figure 8:
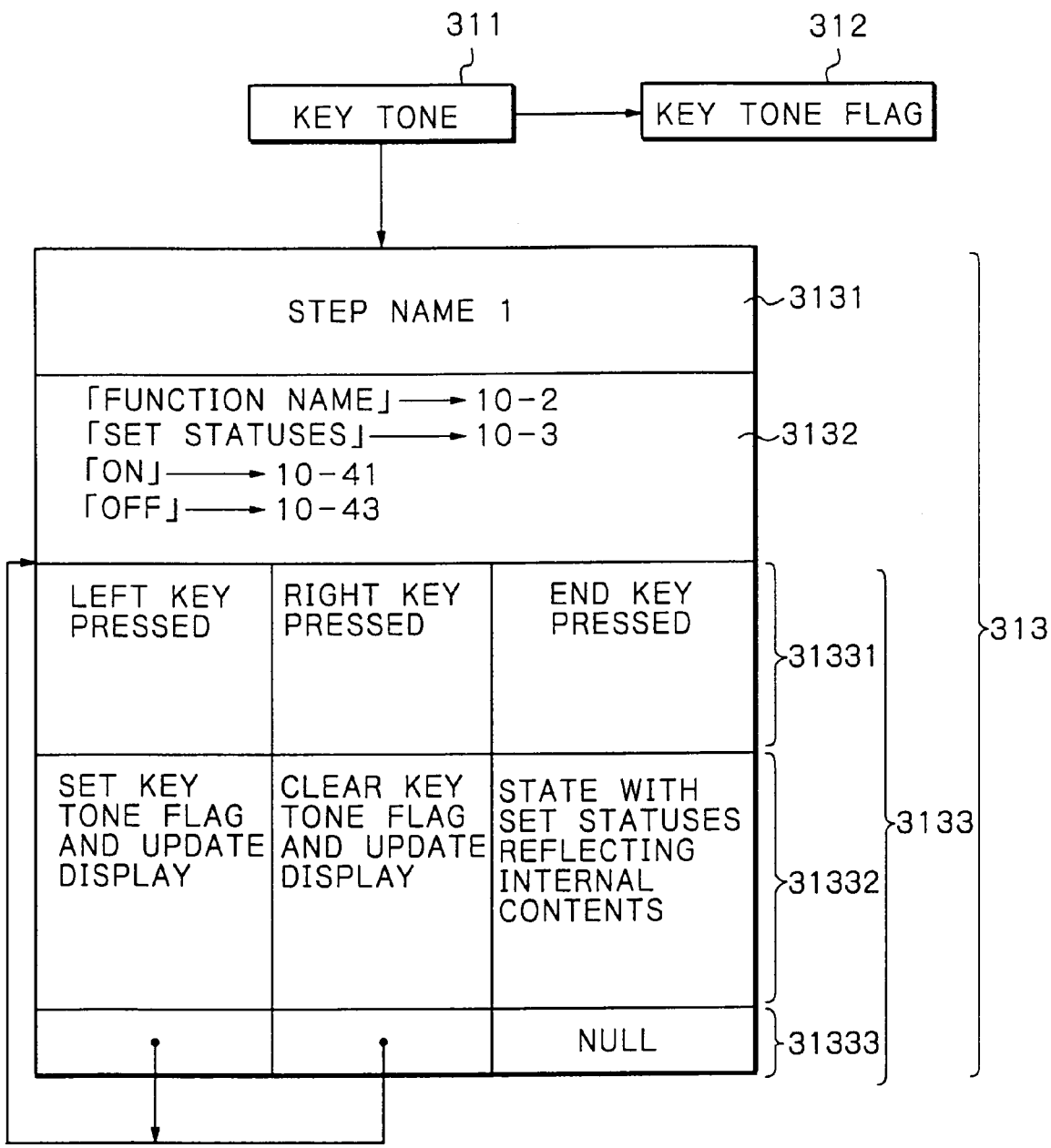
FIG. 8 shows specific setting support information assigned to a key tone function available with the illustrative embodiment.

FIG. 8 shows specific contents of the setting support information 31-X. As shown, the setting support information 31-X has "key tone" as the function name 311 and has the key tone flag as the set status 312. In addition, the information 31-X has one operation step information 313. Specifically, in the operation step information 313, the step name 1 is set in the step name 3131. The display information 3132 causes the function name to appear on the line 10-2 of the display 10, causes the set status to appear on the line 10-3, and causes operation items "ON" and "OFF" to appear in the guide areas 10-41 and 10-43, respectively. In the operation information 3133, a particular operation content 31331, a particular processing content 31332 and particular next step information 31333 are set for each of three different operations. When the left key 12-1 is pressed, the key tone flag is set (ON) while the set status on the display line 10-3 is varied accordingly, and then the control returns. When the right key 12-3 is pressed, the key tone flag is cleared (OFF) while the set status on the display line 10-3 is varied accordingly, and then the control returns. Further, when the end key 12-11 is pressed, the controls returns to a stand-by state with the key tone flag 312 reflecting the status of the key tone flag of the storage area. The stand-by state refers to the initial state in which the phone waits for call origination, call termination or similar event. In the stand-by state, the display lines 10-2 and 10-3 may respectively display the current month, day and day-of-week and the current time.

Figure 9:
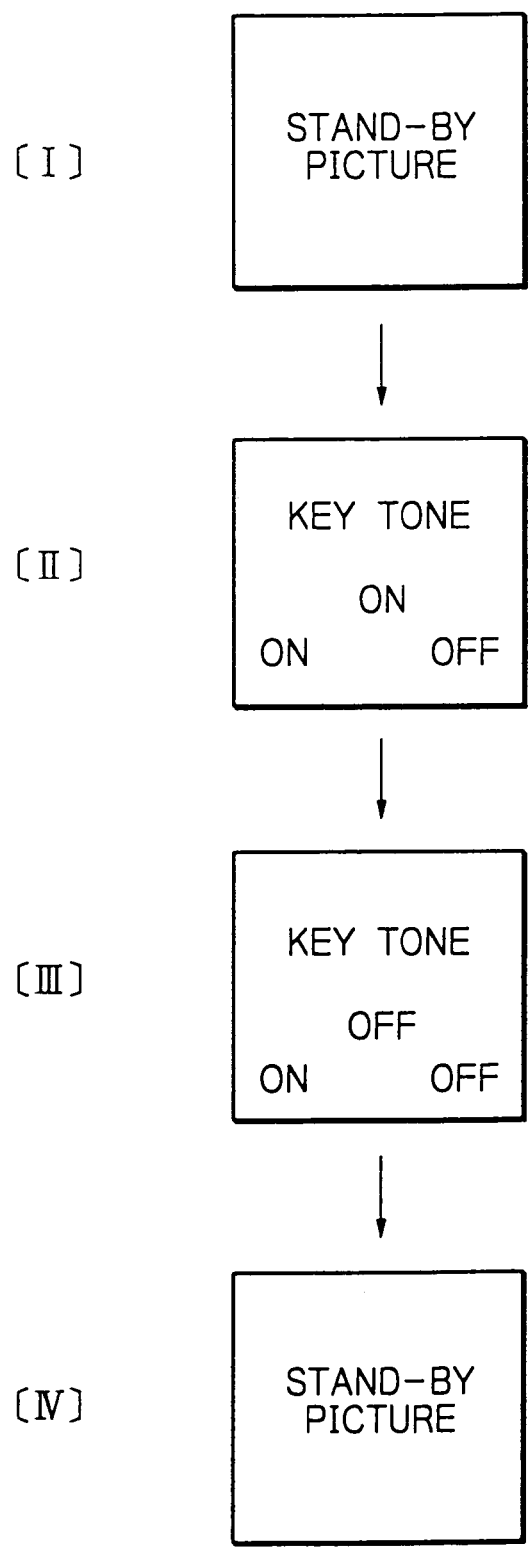
FIG. 9 shows specific pictures sequentially appearing on a display when the key tone function is selected.

FIG. 9 shows specific transition of the picture appearing on the display 10 in relation to the key tone function.

Assume that while a stand-by picture of FIG. 9, [I], is shown on the display 10, the user operates the key input 12 in a preselected manner for selecting the key tone function. Then, the controller 13 starts the function setting support program 33 with a function name "key tone". In response, the support program 33 reads the setting support information 31-X designated by the function name "key tone" included in the setting support information 31 and writes the current key tone flag 312 in its preselected area (step S1, FIG. 6). Then, the support program 33 sets "1" in the step name L which is an internal variable (step S2, FIG. 6), reads the operation step information 313 designated by the step name "1" out of the above support information 31-X (step S3, FIG. 6), and displays a guidance picture of FIG. 9, [II], on the display 10 in accordance with the information 3132 thereof (step S4, FIG. 6). In this specific case, the function name "key tone" appears on the display line 10-2 while "ON" which is the current status of the key tone flag 312 appears on the display line 10-3. Further, the selection items "ON" and "OFF" appear in the left guide area 10-41 and right guide area 10-43, respectively. The picture of FIG. 9, [II], shows the user that the current set state is "ON", that two selection items "ON" and "OFF" are available, and that "ON" or "OFF" can be selected on the left key 12-1 or the right key 12-3, respectively.

When the operator watching the picture of FIG. 9, [II], presses the right key 12-3 by way of example, the support program 33 clears the key tone flag (OFF) stored in its area in accordance with the processing content 31332 associated with the right key 12-3. At the same time, the support program 33 displays "OFF" on the third display line 10-3 in place of "ON", as shown in FIG. 9, [II], (step S6, FIG. 6). Because the step name 1 is set in the next step information 31333 also, the support program 33 returns to the step S5, FIG. 6, for waiting for a user's operation.

When the user watching the picture of FIG. 9, [II], presses the end key 12-11, the support program 33 updates the key tone flag 312 of the setting support information 31-X with the OFF of the key tone flag stored therein in accordance with the processing content 31332 assigned to the end key 12-11. Subsequently, the support program 33 returns to the stand-by state and then ends the processing (steps S6 and S7, FIG. 6). As a result, the stand-by picture again appears on the display 10, as shown in FIG. 9, [IV].

Figure 10:
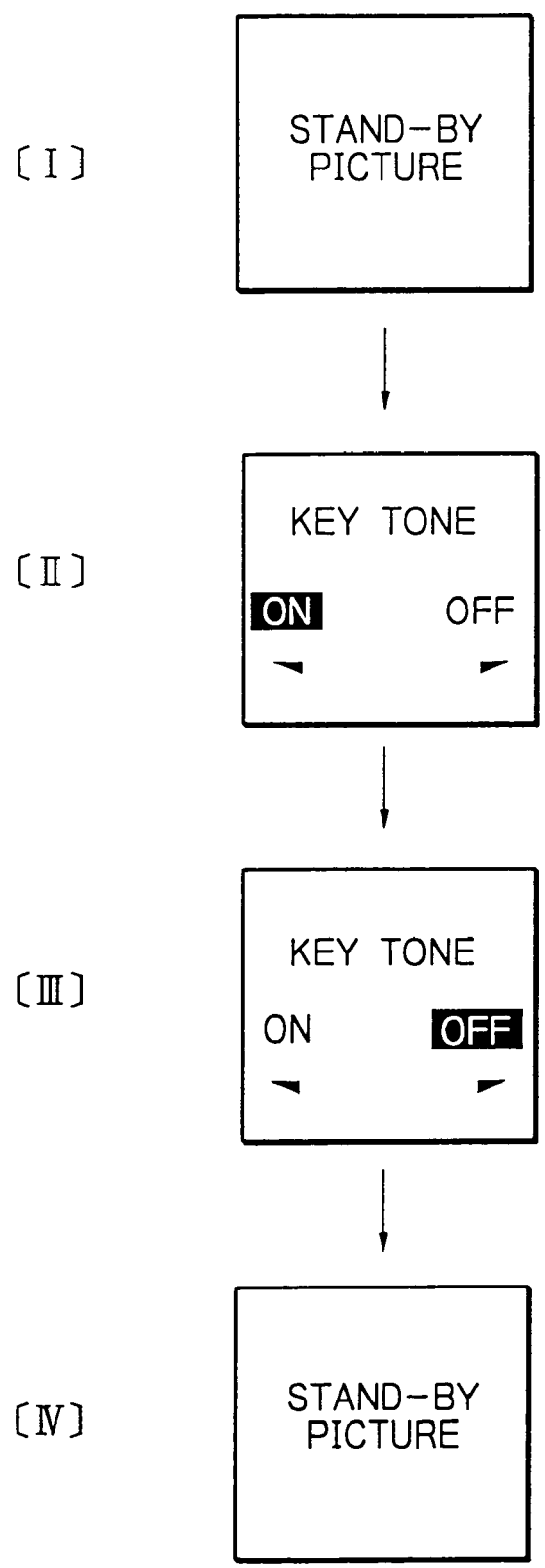
FIG. 10 shows other specific pictures which may appear on the display when the key tone function is selected.

In the above specific procedure, only the current set status appears on the display line 10-3. As shown in FIGS. 10, [II] and [III], in an alternative procedure, "ON" and "OFF" are displayed on the display line 10-3 as two setting statuses available, and "ON", for example, is indicated by an outline if it is currently set. In such a case, "ON" and "OFF" may be respectively displayed right above the guide areas 10-41 and 10-43, in which case preselected marks (e.g. marks provided on the keys 12-1 and 12-3) will be respectively displayed in the guide area 10-41 and 10-43 to show that the characters appearing right about them are representative of operation items.

(2) Automatic Power ON Function

This function has, as the set status 312, an ON flag indicative of whether or not the power supply of the phone should be automatically turned on, an ON time valid when the ON flag is set (ON), and a repeat flag indicative of, when the ON flag is set and when an ON time is set, whether or not the power-up of the phone should be repeated every time at the same time. If the ON flag included in the setting status 312 of the setting support information 31-X is "ON", the function program 32-X automatically turns on the power supply of the phone at the time indicated by the ON time. If the repeat flag is "ON", the function program 32-X turns on the power supply every day at the same time.

Figure 11:
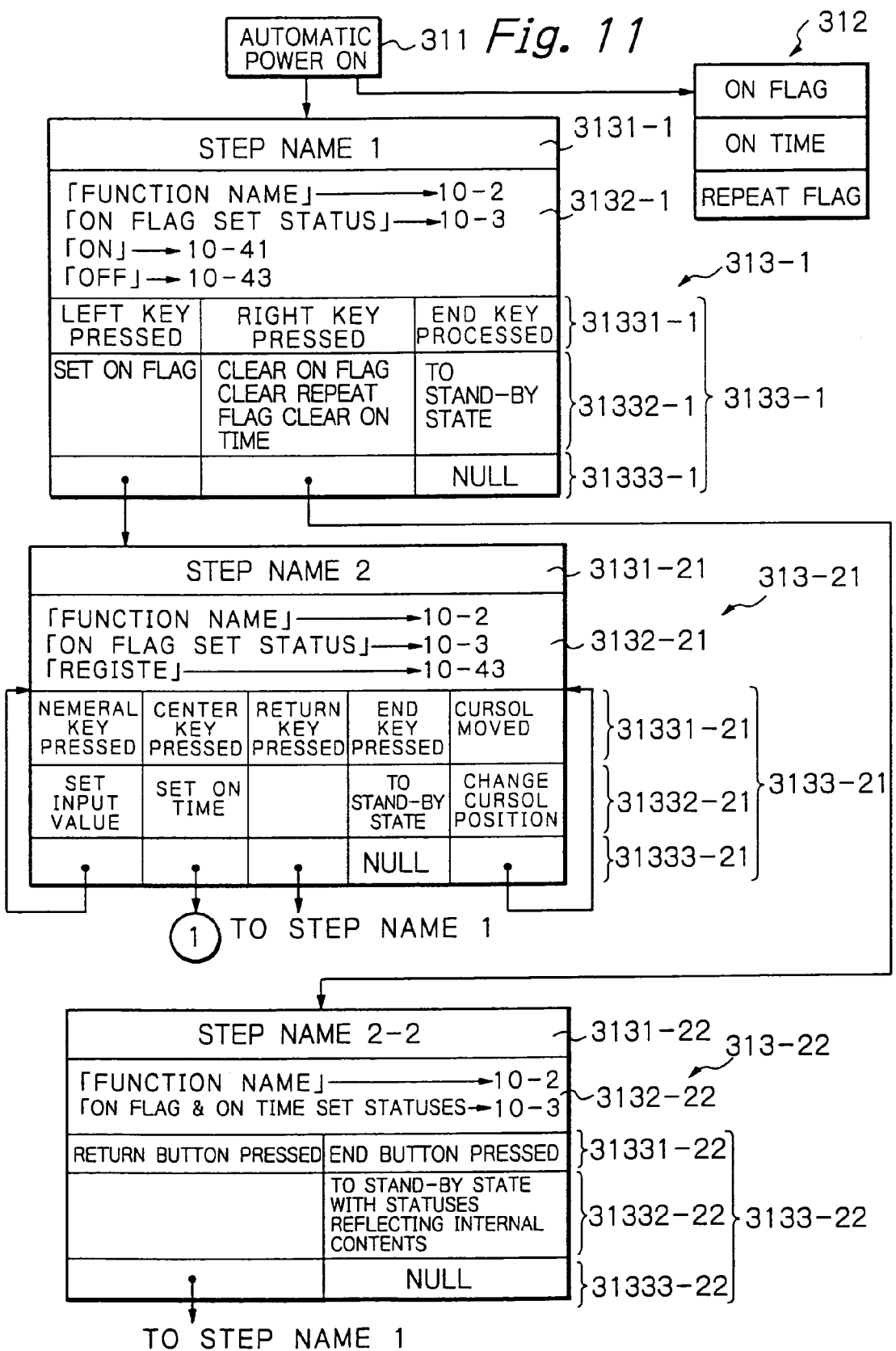
FIGS. 11 and 12 show specific setting support information assigned to an automatic power ON function also available with the illustrative embodiment.
Figure 12:
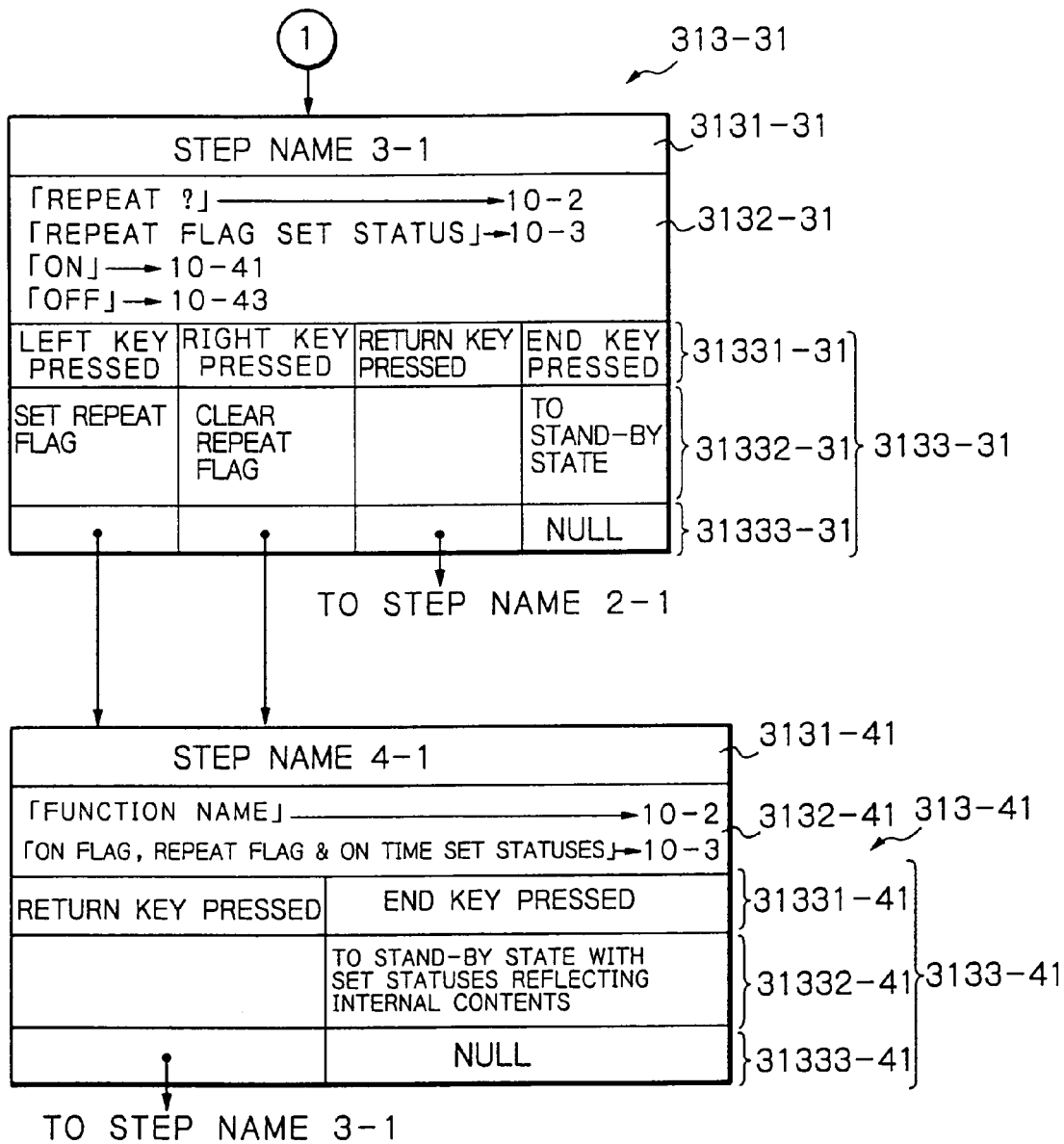

FIGS. 11 and 12 show specific contents of the setting support information 31-X. As shown, the support information 31-X has "automatic power ON" as the function name 311 and has the ON flag, ON time and repeat flag as the set statuses 312. In addition, the support information 31-X has five different operation step information 313-1, 313-21, 313-22, 313-31 and 313-41.

In the operation step information 313-1, the step name 1 is set in a step name 3131-1. Display information 3132-1 causes the function name to appear on the display line 10-2, causes the ON flag set status to appear on the display line 10-3, and causes the operation items "ON" and "OFF" to respectively appear in the guide area 10-41 and 10-43. In operation information 3133-1, a particular operation content 31331-1, a particular processing content 31332-1 and particular next step information 31333-2 are set for each of three different operations. Specifically, when the left key 12-1 is pressed, the ON flag stored in the storage area is set (ON), and this is followed by a step name 2-1. When the right key 12-3 is pressed, the ON flag is cleared (OFF), and this is followed by a step name 2-2. When the end key 12-11 is pressed, the program returns to the stand-by state.

In the operation step information 313-2, the step name 2-1 is set in a step name 3131-21. Display information 3132-21 causes the function time to appears on the display line 10-2, causes the ON time set status to appear on the display line 10-3, and causes a selection item "register" to appear in the guide area 10-42. In operation information 3133-21, a particular operation content 31331-21, a particular processing content 31332-21 and particular next step information are set for each of the five different operations. Specifically, when any one of the numeral keys is pressed, an input value appears at the current cursor position, and the operation returns. When the center key 12-2 is pressed, processing for setting an ON time in the internal storage area is executed, and this is followed by a step name 3-1. When the return key 12-4 is pressed, the operation returns to the immediately preceding step, i.e., step name 1. Further, when the end key 12-11 is pressed, the stand-by state is restored. In addition, when the cursor is shifted, the operation returns. Either the left key 12-1 or the right key 12-3 may be used to shift the cursor.

In operation step information 313-22, the step name 2-2 is set in a step name 3131-22. Display information 3132-22 causes the function name and the ON flag and ON time set status to appear on the display lines 10-2 and 10-3, respectively. In operation information 3133-22, a particular operation content 31331-22, a particular processing content 31332-22 and particular next step information 31333-22 are set for each of two different operations. Specifically, when the return key 12-4 is pressed, the operation returns to the immediately preceding step designated by the step name 1. When the end key 12-11 is pressed, the stand-by state is restored with the setting status 312 reflecting the content of the internal storage area.

In operation step information 313-31, the step name 3-1 is set in a step name 3131-31. Display information 3132-31 causes a character sequence "Repeat?" to appear on the display line 10-2, causes the set status of the repeat flag to appear on the display line 10-3, and causes operation items "ON" and "OFF" to appear in the guide areas 10-41 and 10-43, respectively. In operation information 3133-31, a particular operation content 31332-31, a particular processing content 31332-21 and particular next step information 31333-31 are set for each of four different operations. Specifically, when the left key 12-1 is pressed, the repeat flag in the internal storage area is set (ON), and this is followed by a step name 4-1. When the right key 12-3 is pressed, the repeat flag is cleared (OFF), and this is followed by the step name 4-1 also. When the return key 12-4 is pressed, the operation returns to the immediately preceding step designated by the step name 2-1. Further, when the end key 12-11 is pressed, the stand-by state is restored.

In operation step information 313-41, the step name 4-2 is set in a step name 3131-41. Display information 3132-41 causes the function name to appear on the display line 10-2 and causes the ON flag, repeat flag and ON time set statuses to appear on the display line 10-3. In operation information 3133-41, a particular operation content 31331-41, a particular processing content 31332-41 and particular next step information 31333-41 are set for each of two different operations. Specifically, when the return key 12-4 is pressed, the operation returns to the immediately preceding step designated by the step name 3-1. When the end key 12-11 is pressed, the stand-by state is restored with the set status 312 reflecting the content of the internal storage area.

Figure 13:
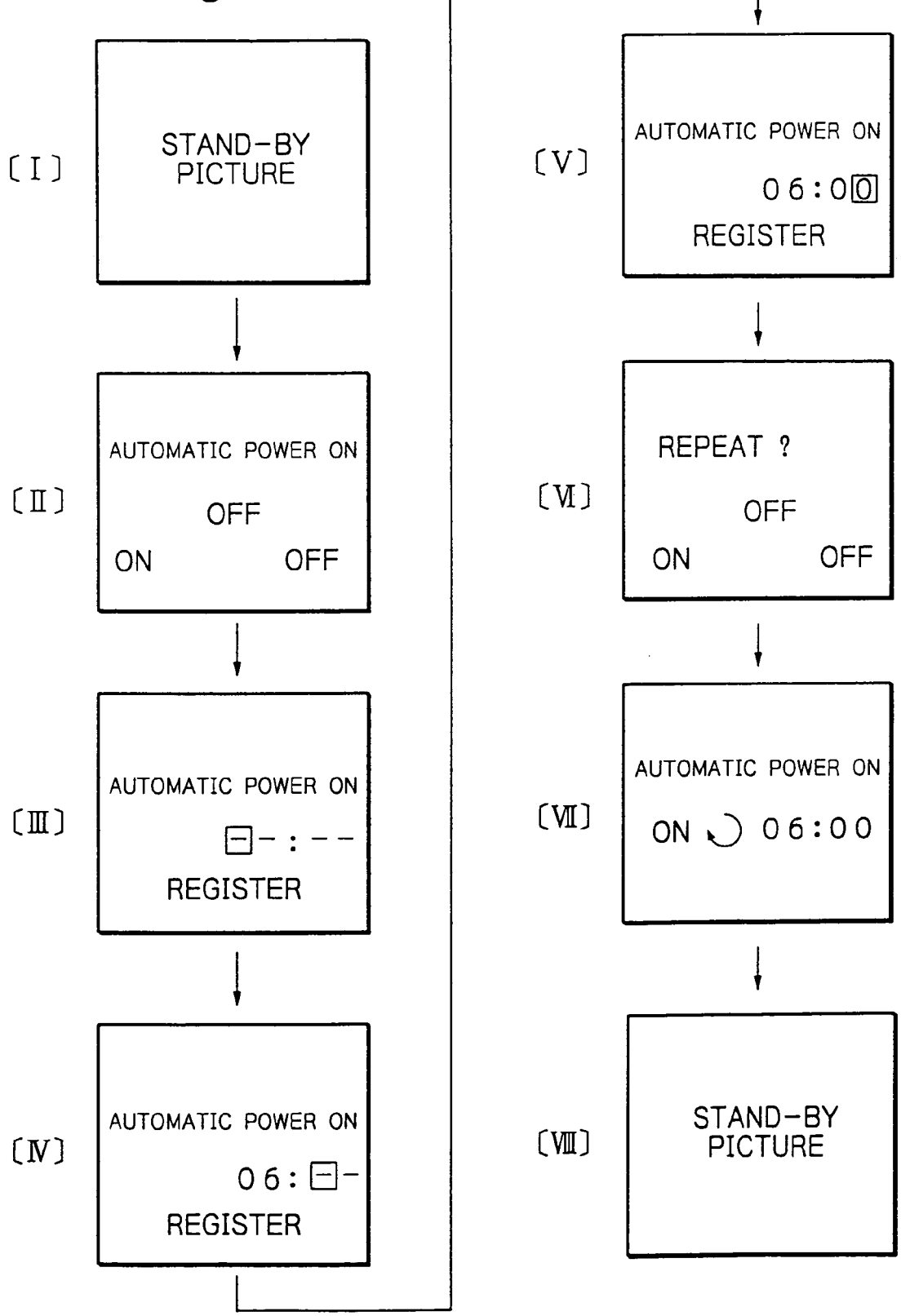
FIG. 13 show specific pictures sequentially appearing on the display when the automatic power ON function is selected.

FIG. 13 shows specific transition of the picture appearing on the display 10 when the user sets the ON flag, sets 6:00 as the ON time, and sets the repeat flag. FIG. 13, [I], shows the stand-by picture; the ON flag is cleared (OFF), the ON time is cleared (OFF), and the repeat flag is cleared (OFF). When the user presses the key input 12 in a preselected manner for selecting the automatic power ON function, the controller 13 starts the function setting support program 33 with the function name "automatic power ON". In response, the support program 33 reads the setting support information 31-X with the function name "automatic power ON" stored in the setting support information 31 and writes the current ON flag, ON time and repeat flag in its storage area (step S1). Subsequently, the support program 33 initially sets "1" in the step name or internal variable L (step S2), reads operation step information 313-1 also stored in the support information 31-X (step S3), and displays a guidance picture of FIG. 13, [II], on the display 10 in accordance with display information 3132-1 (step S4). The picture of FIG. 13, [II], shows the function name "automatic power ON" on the display line 10-2, displays "OFF" which is the current status of the ON flag on the display line 10-3, and displays selection items "ON" and "OFF" in the left and right guide areas 10-41 and 10-43, respectively. This picture shows the user that the current status of the automatic power ON function is OFF, that "ON" and "OFF" are available as two operation items, and that the left key 12-1 or the right key 12-3 may be pressed to select "ON" or "OFF", respectively.

When the user presses the left key 12-1, the support program 33 sets the ON flag (ON) in the storage area in accordance with a processing content 3133-1 assigned to the key 12-1 (step S6, FIG. 6). Because the step name 2-1 has been set in next step information 31333-1, the support program 33 sets the step name 2-1 in the step name L and then returns to the step S3.

In the above step S3, the support program 33 reads operation step information 313-21 designated by the step name 2-1 and displays, in accordance with display information 3132-21, a guidance picture of FIG. 13, [III], on the display 10 (step S4, FIG. 6). That is, the support program 33 displays the current ON time (cleared state) written to the storage area on the display line 10-3, and displays the selection item "register" in the center guidance area 10-42. It is to be noted that the cursor appears at the head of the ON time displayed. The user watching the picture of FIG. 13,

[III], sees that the user is urged to input a ON time, and sequentially inputs a desired ON time on the numeral keys. Every time the user presses one numeral key, the support program 33 displays a corresponding numeral at the position of the cursor and then shifts the cursor to the next position in accordance with the processing content 31332-21 (step S6, FIG. 6) and again waits for a user's operation (step S5). When the user inputs an operation for moving the cursor, the support program 33 executes processing for moving the cursor in a designated direction and then waits for a user's operation (steps S6 and S5, FIG. 6). FIG. 13, [IV], shows a picture showing "06" set as hours included in the ON time.

When the user fully inputs "06:00" as the ON time, a picture shown in FIG. 13, [V], appears on the display 10 together with the selection item "register". When the user presses the center key 12-2 assigned to the guide area 10-42 where "register" is appearing, the support program 33 sets the ON time being displayed in the ON time of the storage area in accordance with the processing content 31332-2 corresponding to the key 12-2 (step S6, FIG. 6) and then returns to the step S3 for executing a step assigned to a step name 3-1 (steps S7 and S8, FIG. 6).

In the above step S3, the support program 33 reads operation step information 313-31 designated by the step name 3-1 and displays a guidance picture of FIG. 13, [VI], on the display 10 in accordance with display information 3132-31 (step S4, FIG. 6). That is, the support program 33 displays the character sequence "Repeat?" on the display line 10-2, asking the user whether or not to select the repeating function. At the same time, the support program 33 displays on the display line 10-3 the value "OFF" of the repeat flag existing in the storage area, and displays selection items "ON" and "OFF" in the left and right guide areas 10-41 and 10-43, respectively. The picture of FIG. 13, [VI], shows the user that the left key 12-1 or the right key 12-3 may be pressed to select the repeating function or to neglect it.

When the user presses the left key 12-1, the support program 33 sets the repeat flag (ON) (step S6, FIG. 6) in accordance with processing content 31332-31 assigned to the key 12-1, sets 4-1 in the next step name L in accordance with the next step information 31333-31 (step S8, FIG. 6), and then returns to the step S3.

In the step S3, the support program 33 reads operation step information 313-41 designated by the step name 4-1 and displays a guidance picture of FIG. 13, [VII], on the display 10 in accordance with display information 3132-41 (step S4, FIG. 6). This is, the support program 33 displays the function name "automatic power ON" on the display line 10-2 and displays the contents of the ON flag, repeat flag and ON time on the display line 10-3. Specifically, when the repeat flag is set (ON), a round arrow precedes the ON time for promoting easy perception, as shown in FIG. 13, [VII]. The picture of FIG. 13, [VII], shows the user that the automatic power ON function is valid, and that the power supply will be turned on every day at 16:00.

When the user watching the picture of FIG. 13, [VII], presses the end key 12-11, the support program 33 updates the set statuses with the ON flag, repeat flag and ON time existing in the storage area in accordance with a processing content 31332-41 relating to the key 12-11 and then ends the processing via the stand-by state (steps S6) and S7, FIG. 6). As a result, the stand-by picture again appears on the display, as shown in FIG. 13, [VIII].

Assume that the user presses the right key 12-3 while the support program 33 is dealing with the operation step information 313-1 designated by the step name 1. Then, the support program 33 clears the ON flag, repeat flag and ON time existing in the storage area in accordance with the processing content 31332-1 assigned to the key 12-3 and then executes processing relating to the step name 2-2 in accordance with the next step information 31333-1. In this processing, the support program 33 displays the function name "automatic power ON", the OFF state of the ON flag existing in the storage area and an ON time setting status "—:—" on the display lines 10-2 and 10-3. Subsequently, when the user presses the end key 12-11, the support program 33 updates the setting statuses with the ON flag, OFF flag and ON time existing in the storage area and then ends the processing via the stand-by state.

Assume that the user presses the end key 12-11 while the support program 33 is dealing with the operation step information 313-1, 313-2 or 313-3, i.e., while setting is under way. Then, the support program 33 restores the stand-by state and then ends the processing. In this case, the set statuses are not updated.

Further, assume that the user presses the return key 12-4 while the support program 33 is dealing with the operation step information 313-21, 313-22, 313-31 or 313-41. Then, the support program 33 returns to the immediately preceding processing.

Figure 14:
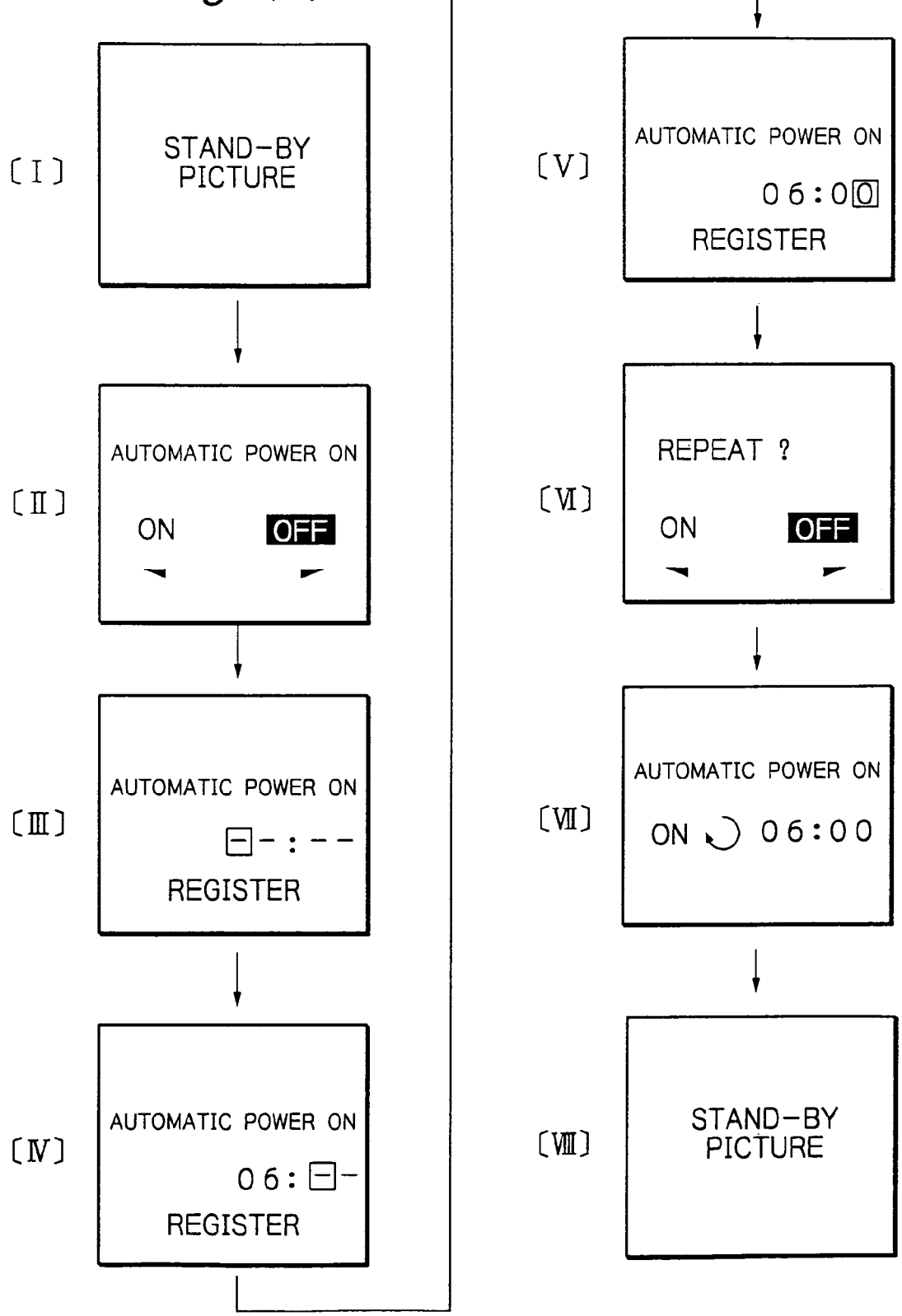
FIG. 14 shows other specific pictures which may appear on the display when the automatic power ON function is selected.

FIGS. 14 [II] and [VI], show specific pictures which may be respectively substituted for the pictures of FIGS. 13, [II] and [IV]. As shown, each picture not only displays "ON" and "OFF" representative of two set statuses available, but also displays, e.g., "ON" in an outline if it is currently set, thereby promoting easy perception. In such a case, "ON" and "OFF" may be respectively displayed right above the guide areas 10-41 and 10-43, in which case preselected marks (e.g. marks provided on the keys 12-1 and 12-3) will be respectively displayed in the guide areas 10-41 and 10-43 to show that the characters appearing right above them are representative of operation items.

(3) Other Functions

The above embodiment is applicable to a handy phone having the following various functions in addition to the key tone function and automatic power ON function. As for sound and vibration, the functions include a function of adjusting an alert tone, and a function of storing an alert tone in the form of an original melody composed by the user and outputting it (including the key tone function). As for a phone book and a memory, the above functions include a function of searching for one of names and phone numbers registered at a phone book in pairs matching with an input name, displaying the name and phone number, and dialing the phone number, and a function of inhibiting the calling, registration and deletion of memory dials or call origination using dial keys. Further, as for a timepiece, the functions include a function of reporting a matter of business to the user at an appointed date and time with an alarm and a message (including the automatic power ON function).

To call any one of the above functions, the user may press a preselected key (e.g. center key 12-2) and then input a particular number assigned to the function. Alternatively, use may be made of a hierarchical menu made up of, e.g., a sound and vibration group including the alert tone adjusting function and original alert tone registering function, a phone book and memory group including the phone book calling function and inhibition setting function, and a timepiece group including the scheduling function.

In summary, in accordance with the present invention, a portable electronic apparatus includes guide areas associated one-to-one with preselected keys arranged on a key input section and displays, in each of consecutive operation steps, guidance information representative of items which can be selected in the above guide areas. This successfully guides the user of the apparatus to an adequate operating method without resorting to key names heretofore displayed to show correspondence between operation items and keys. The apparatus is therefore practicable with a minimum display size.

Generally, every time the function changes or every time the operation step changes in the same function, different operation items which can be selected and therefore different guidance information appear on the guide areas. However, in accordance with the present invention, the keys to be operated by the user are always associated one-to-one with the guidance areas and have different meanings step by step. This is successful to reduce the number of keys and the movement of the user's finger and thereby promotes the easy operation of the apparatus.

Various modifications will become possible for those skilled in the art after receiving the teachings of the present disclosure without departing from the scope thereof. For example, the number of guide areas and that of keys associated therewith are not limited to three, but should only be two or more. In the illustrative embodiment, all the setting support information 31-1 through 31-n of the various functions, including the set statuses 312, and programs 32-1 through 32-n are stored in a nonvolatile memory. If desired, the setting statuses 312 may be stored in an EEPROM or similar nonvolatile memory while the setting support information and programs may be stored in a ROM.

Further, in the illustrative embodiment, even processing common to various setting procedures of different functions and occurring when the numeral keys are pressed or when the cursor is moved is defined in the setting support information function by function. Alternatively, the common processing may be stored in an exclusive common processing storage, and the function setting support program may reference such a storage for determining a content of processing. Of course, the present invention is applicable not only to a handy phone shown and described, but also to any other portable electronic apparatus, e.g., an electronic notebook.

What is claimed is:

1. A portable electronic device, comprising:
a memory which stores at least two functions and at least two items assigned to at least one of the functions;
a display which displays at least a first picture and a second picture,
wherein, the first picture comprises
(a) a function,
(b) a first item displayed at a first predetermined position of the display and assigned to the displayed function, and
(c) a second item displayed at a second predetermined position of the display and assigned to the displayed function,
wherein the second picture does not include any item which is assigned to a function or which is displayed at either the first predetermined position or the second predetermined position, and
wherein the display displays the second picture in response to a selection of the first item;
a first button, corresponding to the displayed first item, wherein the pressing of the first button indicates the selection of the first item when the display is displaying the first picture; and
a second button, corresponding to the displayed second item, wherein the pressing of the second button indicates a selection of the second item when the display is displaying the first picture;
wherein,
when the display is displaying the second picture, the pressing of the first button or the second button indicates one or more actions unrelated to the first item or the second item.

2. The portable electronic device according to claim 1, wherein:
a first item assigned to the displayed function is an "on" item, wherein the pressing of the first button, when the display displays the "on" item, turns the displayed function on; and
a second item assigned to the displayed function is an "off" item, wherein the pressing of the second button, when the display displays the "off" item, turns the displayed function off.

3. The portable electronic apparatus according to claim 1, wherein:
the at least two functions include an automatic power function;
a first item assigned to the automatic power function is an "on" item, wherein the pressing of the first button, when the display displays the "on" item, turns the automatic power on; and
a second item assigned to the automatic power function is an "off" item, wherein the pressing of the second button, when the display displays the "off" item, functions turns the automatic power off.

4. The portable electronic device according to claim 1, wherein:
when the display is not displaying the first picture, the pressing of the first button functions to move a cursor, displayed on the display, in a first direction; and
when the display is not displaying the first picture, the pressing of the second button functions to move a cursor, displayed on the display, in a second direction.

5. The portable electronic device according to claim 1, wherein:
the first button is located directly below the display of the first item; and
the second button is located directly below the display of the second item.

6. The portable electronic device according to claim 1, wherein:
the portable electronic device comprises a phone.

7.

8. A portable electronic device, comprising:
means for storing at least two functions and at least two items assigned to at least one of the functions;
means for displaying at least a first picture and a second picture,
wherein the first picture comprises:
(a) a function,
(b) a first item displayed at a first predetermined position of the means for displaying and assigned to the displayed function, and
(c) a second item displayed at a second predetermined position of the means for displaying and assigned to the displayed function,
wherein the second picture does not include any item which is assigned to a function or which is displayed at either the first predetermined position or the second predetermined position, and wherein the means for displaying displays the second picture in response to a selection of the first item;

a first button, corresponding to the displayed first item, wherein the pressing of the first button indicates the selection of the first item when the means for displaying is displaying the first picture; and a second button, corresponding to the displayed second item, wherein the pressing of the second button indicates a selection of the second item when the means for displaying is displaying the first picture;

wherein, when the means for displaying is displaying the second picture, the pressing of the first button or the second button indicates one or more actions unrelated to the first item or the second item.

9. The portable electronic device according to claim 8, wherein:

a first item assigned to the displayed function is an "on" item, wherein the pressing of the first button, when the means for displaying displays the "on" item, turns the displayed function on; and a second item assigned to the displayed function is an "off" item, wherein the pressing of the second button, when the means for displaying displays the "off" item, turns the displayed function off.

10. The portable electronic apparatus according to claim 8, wherein:

the at least to functions include an automatic power function;

a first item assigned to the automatic power function is an "on" item, wherein the pressing of the first button, when the means for displaying displays the "on" item, turns the automatic power on; and a second item assigned to the automatic power function is an "off" item, wherein the pressing of the second button, when the means for displaying displays the "off" item, functions turns the automatic power functions off.

11. The portable electronic device according to claim 8, wherein:

when the means for displaying is not displaying the first picture, the pressing of the first button functions to move a cursor, displayed on the display, in a first direction; and when the means for displaying is not displaying the first picture, the pressing of the second button functions to move a cursor, displayed on the display, in a second direction.

12. The portable electronic device according to claim 8, wherein:

the first button is located directly below the display of the first item; and the second button is located directly below the display of the second display.

13. The portable electronic device according to claim 8, wherein:

the portable electronic device comprises a phone.

14. The portable electronic device according to claim 8, further comprising an end button, wherein when the end button is pressed while the first picture is displayed, the portable electronic device returns the portable electronic device to a stand-by state.

15. A portable electronic device, comprising:

a display which displays at least a first picture and a second picture, wherein said first picture comprises a first item displayed at a first predetermined position and a second item displayed at a second predetermined position, wherein said second picture does not include any items at the first predetermined position or at the second predetermined position, and wherein said display displays said second picture in response to a selection of said first item;

a first button, wherein the selection of said first item is executed by a depression of said first button when said first picture is being displayed; and a second button, wherein a selection of said second item is executed by a depression of said second button when said first picture is being displayed;

wherein a first action, which is unrelated to said first item or to said second item, is executed by a depression of said first button when said second picture is being displayed.

16. The portable electronic device according to claim 15, wherein:

said first item is "on" and a depression of said first button when said first picture is being displayed turns a function one, and said second item is "off" and a depression of said second button when said first picture is being displayed turns the function off.

17. The portable electronic device according to claim 15, wherein:

said first item is "on" and a depression of said first button when said first picture is being displayed turns an automatic power function one, and said second item is "off" and a depression of said second button when said first picture is being displayed turns the automatic power function off.

18. The portable electronic device according to claim 15, wherein:

when the first picture is not being displayed, a depression of said first button functions to move a cursor, displayed on the display, in a first direction, and a depression of said second button functions to move the cursor in a second direction.

19. The portable electronic device according to claim 15, wherein:

said first button is located directly below the display of the first item, and said second button is located directly below the display of the second item.

20. The portable electronic device according to claim 15, wherein the portable electronic device comprises a phone.

21. The portable electronic device according to claim 15, further comprising an end button, wherein when the end button is pressed while the first picture is displayed, the portable electronic device returns the portable electronic device to a stand-by state.

22. A portable electronic device, comprising:

a means for displaying at least a first picture and a second picture, wherein said first picture comprises a first item displayed at a first predetermined position and a second item displayed at a second predetermined position, wherein said second picture does not include any items at the first predetermined position or at the second predetermined position, and wherein said means for displaying displays said second picture in response to a selection of said first item;

a first execution means, wherein the selection of said first item is executed by the first execution means; and a second execution means, wherein a selection of said second item is executed by the second execution means;

wherein a first action, which is unrelated to said first item or to said second item is executed by the first execution means when said second picture is being displayed.

23. The portable electronic device according to claim 22, wherein:
said first item is "on" and, when said first picture is being displayed, said first execution means turns a function on, and
said second item is "off" and, when said first picture is being displayed, said second execution means turns the function off.

24. The portable electronic device according to claim 22, wherein:
said first item is "on" and, when said first picture is being displayed, said second execution means turns the automatic power function off.

25. The portable electronic device according to claim 22, wherein:
when the first picture is not being displayed, said first execution means moves a cursor, displayed on the display means, in a first direction, and said second execution means moves the cursor in a second direction.

26. The portable electronic device according to claim 22, wherein:
said first execution means is located directly below the display of the first item, and said second execution means is located directly below the display of the second item.

27. The portable electronic device according to claim 22, wherein the portable electronic device comprises a phone.

28. The portable electronic device according to claim 15, wherein a second action, which is unrelated to said first item or said second item is executed by a depression of said second button when said second picture is being displayed.

29. The portable electronic device according to claim 22, wherein a second action, which is unrelated to said first item or to said second item is executed by the second execution means when said second picture is being displayed.

30. The portable electronic device according to claim 22, further comprising a third execution means, wherein the third execution means returns the portable electronic device to a stand-by state.

* * * * *

UNITED STATES PATENT AND TRADEMARK OFFICE
CERTIFICATE OF CORRECTION

PATENT NO. : 7,167,729 B1
APPLICATION NO. : 09/408265
DATED : January 23, 2007
INVENTOR(S) : Etsuko Kimura It is certified that error appears in the above-identified patent and that said Letters Patent is hereby corrected as shown below:

Claims 7-29 should read,

Col. 12 lines 49-67 & Col. 13 lines 1-14 should be
7. A portable electronic device, comprising:
 means for storing at least two functions and at least two items assigned to at least one
of the functions;
 means for displaying at least a first picture and a second picture,
  wherein the first picture comprises:
   (a) a function,
   (b) a first item displayed at a first predetermined position of the means for
  displaying and assigned to the displayed function, and
   (c) a second item displayed at a second predetermined position of the means for
  displaying and assigned to the displayed function,
  wherein the second picture does not include any item which is assigned to a function or
 which is displayed at either the first predetermined position or the second predetermined
 position, and
  wherein the means for displaying displays the second picture in response to a
 selection of the first item;
 a first button, corresponding to the displayed first item, wherein the pressing of the first button
indicates the selection of the first item when the means for displaying is displaying the first picture; and
a second button, corresponding to the displayed second item, wherein the pressing of the second button
indicates a selection of the second item when the means for displaying is displaying the first picture;
  wherein, when the means for displaying is displaying the second picture, the pressing of
the first button or the second button indicates one or more actions unrelated to the first item or
the second item.

Col. 13 lines 15-22 should be
8. The portable electronic device according to claim 7, wherein:
 a first item assigned to the displayed function is an "on" item, wherein the pressing of the first
button, when the means for displaying displays the "on" item, turns the displayed function on; and
a second item assigned to the displayed function is an "off" item, wherein the pressing of the second
button, when the means for displaying displays the "off" item, turns the displayed function off.

Col. 13 lines 23-30 should be
9. The portable electronic apparatus according to claim 7, wherein:
 the at least to functions include an automatic power function;
 a first item assigned to the automatic power function is an "on" item, wherein the pressing of the
first button, when the means for displaying displays the "on" item, turns the automatic power on; and
a second item assigned to the automatic power function is an "off" item, wherein the pressing of the
second button, when the means for displaying displays the "off" item, functions turns the automatic
power function off.

Col. 13 lines 31-35 should be
10. The portable electronic device according to claim 7, wherein:
  when the means for displaying is not displaying the first picture, the pressing of the first button functions to move a cursor, displayed on the display, in a first direction; and
when the means for displaying is not displaying the first picture, the pressing of the second button functions to move a cursor, displayed on the display, in a second direction.

Col. 13 lines 36-38 should be
11. The portable electronic device according to claim 7, wherein:
  the first button is located directly below the display of the first item; and
the second button is located directly below the display of the second display.

Col. 13 lines 39-40 should be
12. The portable electronic device according to claim 7, wherein:
the portable electronic device comprises a phone.

Col. 13 lines 41-43 should be
13. The portable electronic device according to claim 7, further comprising an end button, wherein when the end button is pressed while the first picture is displayed, the portable electronic device returns the portable electronic device to a stand-by mode.

Col. 13 lines 44-63 should be
14. A portable electronic device, comprising:
  a display which displays at least a first picture and a second picture,
    wherein said first picture comprises a first item displayed at a first predetermined position and a second item displayed at a second predetermined position,
    wherein said second picture does not include any items at the first predetermined position or at the second predetermined position, and
    wherein said display displays said second picture in response to a selection of said first item;
  a first button, wherein the selection of said first item is executed by a depression of said first button when said first picture is being displayed; and
  a second button, wherein a selection of said second item is executed by a depression of said second button when said first picture is being displayed;
wherein a first action, which is unrelated to said first item or to said second item, is executed by a depression of said first button when said second picture is being displayed.

Col. 14 lines 1-7 should be
15. The portable electronic device according to claim 14, wherein:
  said first item is "on" and a depression of said first button when said first picture is being displayed turns a function on, and
said second item is "off" and a depression of said second button when said first picture is being displayed turns the function off.

In addition to changing the claim number to 16 and the dependency to claim 14, in Col. 14, line 28, delete "one" and insert --on--

Col. 14 lines 8-13 should be
16. The portable electronic device according to claim 14, wherein:
    said first item is "on" and a depression of said first button when said first picture is being displayed turns an automatic power function on, and
said second item is "off" and a depression of said second button when said first picture is being displayed turns the automatic power function off.

Col. 14 lines 13-17 should be
17. The portable electronic device according to claim 14, wherein:
when the first picture is not being displayed, a depression of said first button functions to move a cursor, displayed on the display, in a first direction, and a depression of said second button functions to move the cursor in a second direction.

Col. 14 lines 18-21 should be
18. The portable electronic device according to claim 14, wherein:
said first button is located directly below the display of the first item, and said second button is located directly below the display of the second item.

Col. 14 lines 22-24 should be
19. The portable electronic device according to claim 14, wherein the portable electronic device comprises a phone.

Col. 14 lines 25-27 should be
20. The portable electronic device according to claim 14, further comprising an end button, wherein when the end button is pressed while the first picture is displayed, the portable electronic device returns the portable electronic device to a stand-by state.

Col. 14 lines 28-43 should be
21. A portable electronic device, comprising:
    a means for displaying at least a first picture and a second picture,
        wherein said first picture comprises a first item displayed at a first predetermined position and a second item displayed at a second predetermined position,
        wherein said second picture does not include any items at the first predetermined position or at the second predetermined position, and
        wherein said means for displaying displays said second picture in response to a selection of said first item;
    a first execution means, wherein the selection of said first item is executed by the first execution means; and
    a second execution means, wherein a selection of said second item is executed by the second execution means;
wherein a first action, which is unrelated to said first item or to said second item is executed by the first execution means when said second picture is being displayed.

CERTIFICATE OF CORRECTION (continued)
U.S. Pat. No. 7,167,729 B1

Col. 14 lines 44-49 should be
22. The portable electronic device according to claim 21, wherein:
    said first item is "on" and, when said first picture is being displayed, said first execution means turns a function on, and
said second item is "off" and, when said first picture is being displayed, said second execution means turns the function off.

Col. 14 lines 50-55 should be
23. The portable electronic device according to claim 21, wherein:
    said first item is "on" and, when said first picture is being displayed, said first execution means turns an automatic power function on, and
said second item is "off" and, when said first picture is being displayed, said second execution means turns the automatic power function off.

Col. 15 lines 1-5 should be
24. The portable electronic device according to claim 21, wherein:
    when the first picture is not being displayed, said first execution means moves a cursor, displayed on the display means, in a first direction, and said second execution means moves the cursor in a second direction.

Col. 15 lines 6-9 should be
25. The portable electronic device according to claim 21, wherein:
    said first execution means is located directly below the display of the first item, and said second execution means is located directly below the display of the second item.

Col. 15 lines 10-12 should be
26. The portable electronic device according to claim 21, wherein the portable electronic device comprises a phone.

Col. 15 lines 13-15 should be
27. The portable electronic device according to claim 14, wherein a second action, which is unrelated to said first item or said second item is executed by a depression of said second button when said second picture is being displayed.

Col. 15 lines 16-18 should be
28. The portable electronic device according to claim 21, wherein a second action, which is unrelated to said first item or to said second item is executed by the second execution means when said second picture is being displayed.

CERTIFICATE OF CORRECTION (continued)
U.S. Pat. No. 7,167,729 B1

Col. 15 lines 19-21 should be
29. The portable electronic device according to claim 21, further comprising a third execution means, wherein the third execution means returns the portable electronic device to a stand-by state.

Signed and Sealed this

Second Day of February, 2010

David J. Kappos
*Director of the United States Patent and Trademark Office*